(12) United States Patent
Disler

(10) Patent No.: US 7,481,023 B1
(45) Date of Patent: Jan. 27, 2009

(54) PESTICIDE INJECTION SYSTEM

(76) Inventor: Gregory A. Disler, 210 Presidential Dr. Apt. #401, Greenville, DE (US) 19807

( * ) Notice: Subject to any disclaimer, the term of this patent is extended or adjusted under 35 U.S.C. 154(b) by 71 days.

(21) Appl. No.: 11/526,889

(22) Filed: Sep. 21, 2006

Related U.S. Application Data

(63) Continuation-in-part of application No. 11/313,182, filed on Dec. 19, 2005, now Pat. No. 7,127,846.

(51) Int. Cl.
*A01M 9/00* (2006.01)

(52) U.S. Cl. .................... 43/132.1; 43/124; 239/271; 239/302

(58) Field of Classification Search ........... 43/124–144, 43/132.1, 134, 131, 900; 222/257, 514; 239/271, 302, 307
See application file for complete search history.

(56) References Cited

U.S. PATENT DOCUMENTS

| | | | | |
|---|---|---|---|---|
| 361,010 | A * | 4/1887 | Houchin | 43/132.1 |
| 1,106,679 | A * | 8/1914 | Randall | 239/271 |
| 1,153,044 | A * | 9/1915 | Dunham | 43/124 |
| 2,755,968 | A * | 7/1956 | Fiant | 43/124 |
| 2,968,441 | A * | 1/1961 | Holcomb | 239/337 |
| 2,981,025 | A * | 4/1961 | Woodson | 43/124 |
| 3,209,485 | A * | 10/1965 | Griffin | 43/124 |
| 3,306,449 | A * | 2/1967 | Lykes | 210/123 |
| 3,306,499 | A * | 2/1967 | Lykes | 239/327 |
| 3,322,623 | A * | 5/1967 | Doakley | 43/132.1 |
| 3,368,302 | A * | 2/1968 | Martino | 222/402.1 |
| 4,534,128 | A * | 8/1985 | Query et al. | 43/132.1 |
| 4,625,808 | A * | 12/1986 | Halfpenny | 239/271 |
| 4,648,202 | A * | 3/1987 | Renth | 43/132.1 |
| 4,805,341 | A * | 2/1989 | Maeda | 43/132.1 |
| 4,809,462 | A * | 3/1989 | Maeda | 43/132.1 |
| 4,823,505 | A * | 4/1989 | Jackson | 43/124 |
| 4,944,110 | A * | 7/1990 | Sims | 43/124 |
| 4,945,673 | A * | 8/1990 | Lavelle | 43/124 |
| 5,050,338 | A * | 9/1991 | Doakley et al. | 43/132.1 |
| 5,054,231 | A * | 10/1991 | Witherspoon | 43/132.1 |
| 5,058,312 | A * | 10/1991 | Jackson | 43/132.1 |
| 5,148,627 | A * | 9/1992 | Thomas | 43/132.1 |
| 5,165,199 | A * | 11/1992 | Tallon | 43/132.1 |
| 5,231,796 | A * | 8/1993 | Sims | 43/124 |

(Continued)

FOREIGN PATENT DOCUMENTS

GB 2266348 A * 10/1993

(Continued)

*Primary Examiner*—Darren W Ark
(74) *Attorney, Agent, or Firm*—Joseph R. Birkner

(57) ABSTRACT

A pesticide injection system for exterminating insects is provided. The pesticide injection system comprises an applicator and a plug frictionally engagable with a wall. The applicator includes a pliable bottle for receiving a powder pesticide and a nozzle for injecting a powder pesticide into a blind space behind a wall suspected of harboring insects without the powder pesticide contacting the insulation. The plug has a check valve to prevent back flow and a door with a door seal to prevent the powder pesticide from spilling into a living space during use. The nozzle has a sleeve biased in a closed position by a sleeve spring for cooperatively exposing a port on the nozzle with an interlocking collar for rotatably engaging a guide on the collar and a tang on the nozzle with a flange on the plug.

20 Claims, 7 Drawing Sheets

U.S. PATENT DOCUMENTS

| | | | | |
|---|---|---|---|---|
| 5,246,675 A * | 9/1993 | Castronovo | | 43/900 |
| 5,249,391 A * | 10/1993 | Rodgers | | 47/57.5 |
| 5,309,669 A * | 5/1994 | Jackson | | 43/124 |
| 5,361,533 A * | 11/1994 | Pepper | | 43/132.1 |
| 5,471,784 A * | 12/1995 | Merving | | 47/57.5 |
| 5,542,207 A * | 8/1996 | Morris, Sr. | | 43/132.1 |
| 5,868,320 A * | 2/1999 | Laabs et al. | | 239/307 |
| 6,227,419 B1 * | 5/2001 | Raboin | | 222/484 |
| 6,325,304 B1 * | 12/2001 | Brite et al. | | 239/333 |
| 6,493,987 B1 * | 12/2002 | Aesch et al. | | 43/132.1 |
| 6,523,298 B2 * | 2/2003 | Neumann | | 43/132.1 |
| 6,604,318 B1 * | 8/2003 | Cassidy | | 43/132.1 |
| 6,668,939 B2 * | 12/2003 | Schmidt et al. | | 239/271 |
| 6,688,036 B1 * | 2/2004 | Gunn | | 43/132.1 |
| 6,708,444 B2 * | 3/2004 | Aesch, Jr. | | 43/132.1 |
| 6,840,004 B1 * | 1/2005 | Allen | | 43/132.1 |
| 6,907,690 B1 * | 6/2005 | Stallings | | 43/132.1 |
| 6,966,143 B2 * | 11/2005 | Allen | | 43/124 |
| 6,966,145 B1 * | 11/2005 | Taft et al. | | 43/132.1 |
| 7,127,846 B1 * | 10/2006 | Disler | | 43/132.1 |
| 2003/0015191 A1 * | 1/2003 | Armstrong et al. | | 222/402.1 |
| 2008/0251514 A1 * | 10/2008 | Fitzpatrick et al. | | 43/124 |

FOREIGN PATENT DOCUMENTS

| | | | | |
|---|---|---|---|---|
| JP | 09192554 A | * | 7/1997 |
| JP | 09205972 A | * | 8/1997 |
| JP | 2000032899 A | * | 2/2000 |
| JP | 2001031517 A | * | 2/2001 |

* cited by examiner

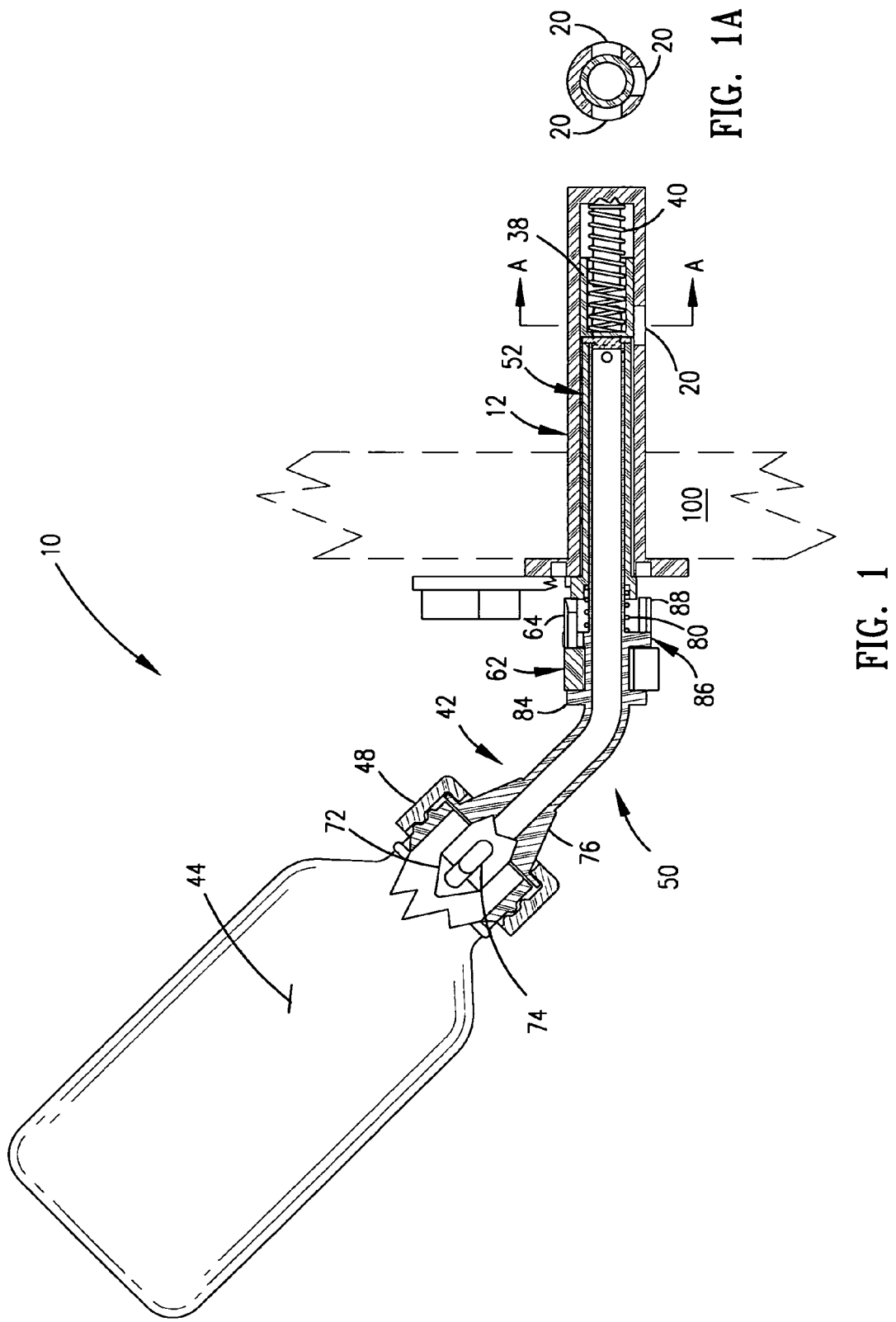

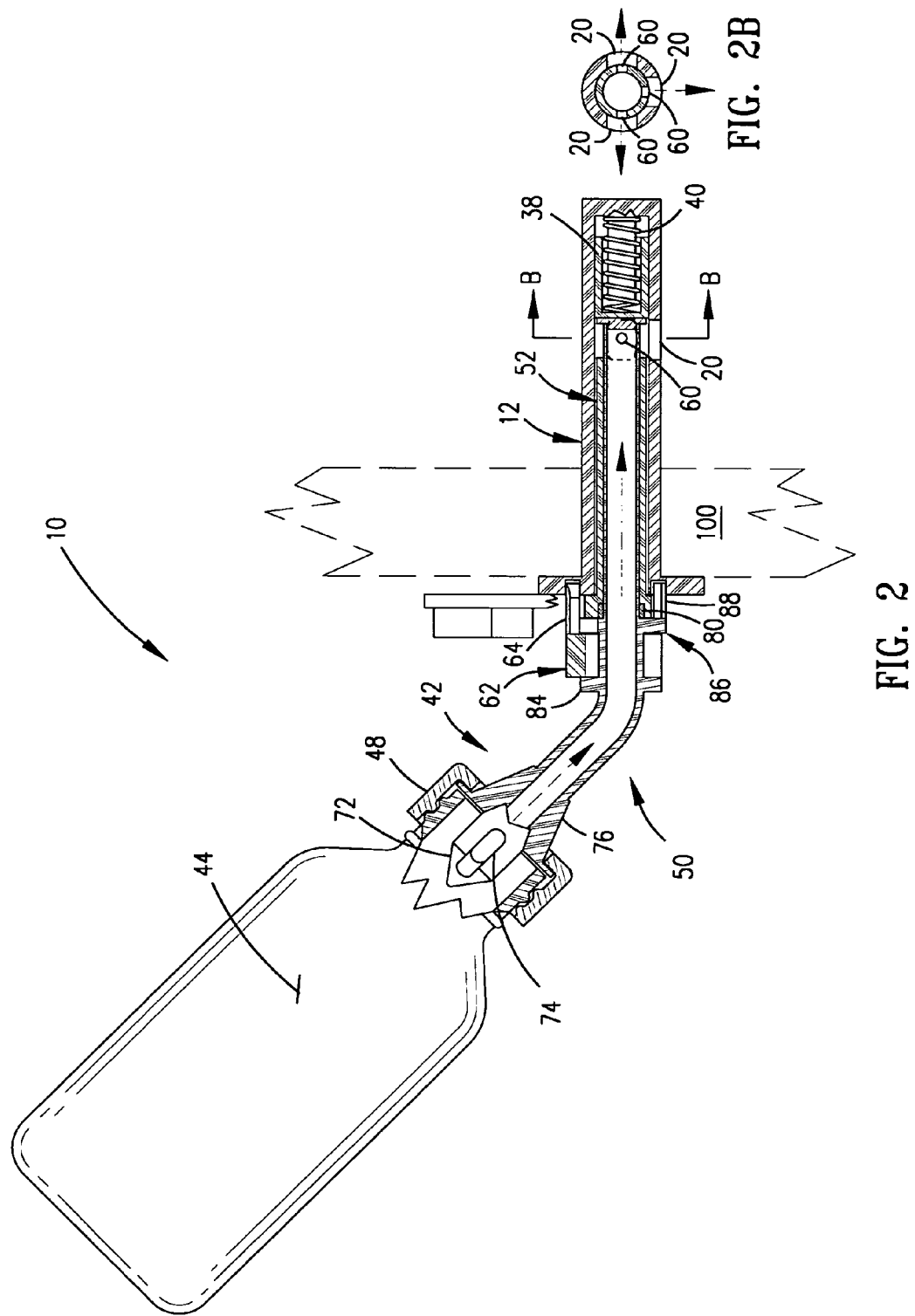

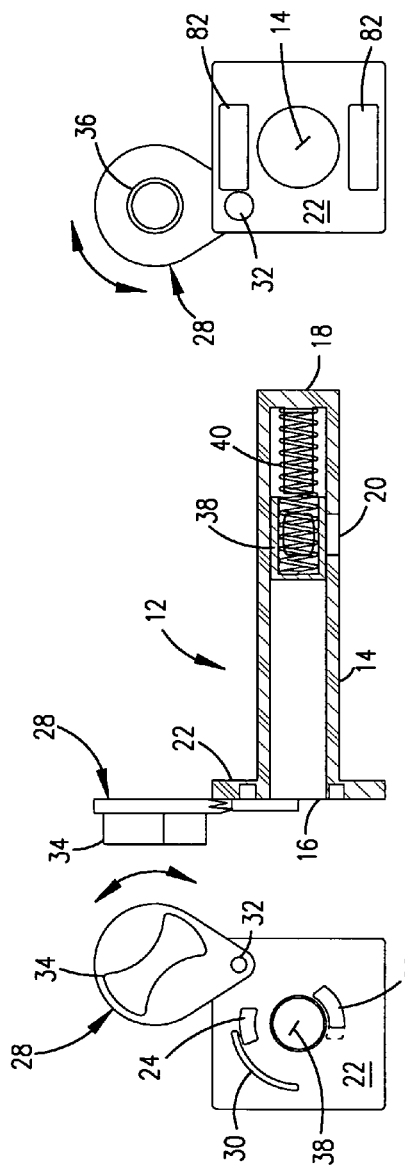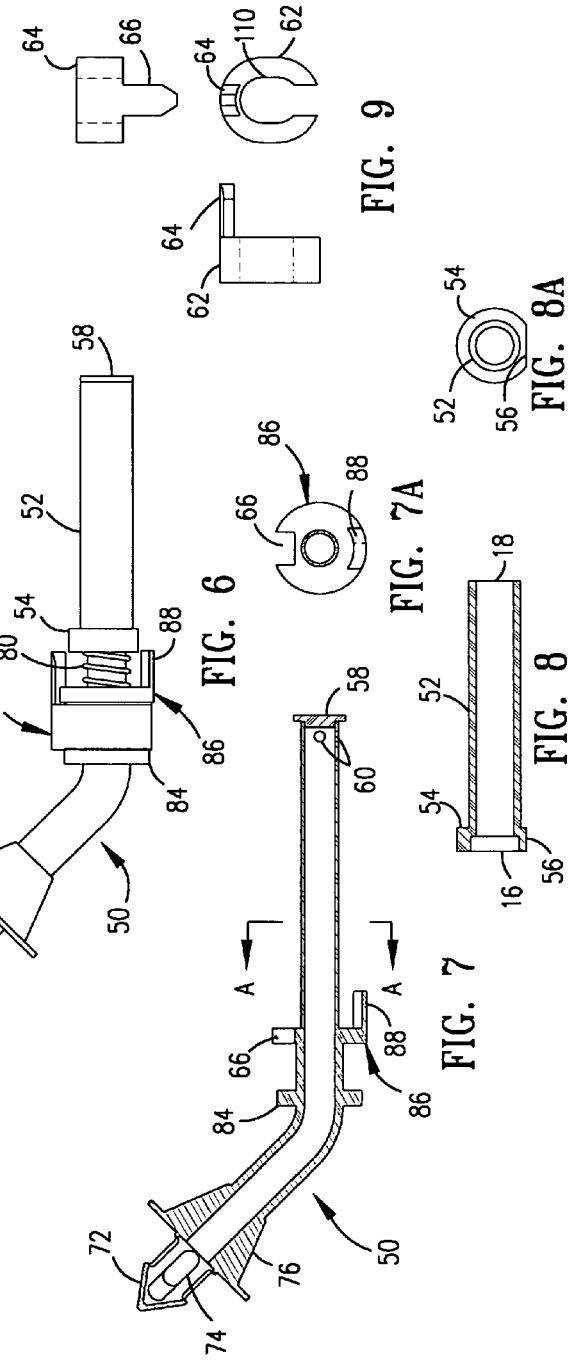

PESTICIDE INJECTION SYSTEM

CROSS-REFERENCE TO RELATED APPLICATIONS

This application is a continuation-in-part of prior U.S. patent application Ser. No. 11/313,182, filed Dec. 19, 2005 now U.S. Pat. No. 7,127,846, and incorporated herein by reference in its entirety.

FIELD OF THE INVENTION

This invention relates generally to pest control. More particularly, the present invention relates to a pesticide injection system for treating potential insect infected areas in a blind wall cavity.

BACKGROUND OF THE INVENTION

Pest control of insects is usually provided by professional exterminators who fumigate an insect infected area of a structure by spraying liquefied chemicals into such areas. More often than not, treated areas must be sprayed regularly, ie. weekly or monthly. Also, during chemical spraying, the home owners are often asked to leave the home. The above issues cause the building or home owner inconvenience and an added expense as well as safety concerns especially to children and pets who may later come into contact with the toxic chemicals. If professional exterminators are felt to be not needed, the home owners try to apply sprays and powders themselves leaving them open to safety issues as well as ineffectively treating the affected areas. Commercial establishments such as restaurants are even more at risk for health and safety issues as a result of extermination services. Schools, houses of worship and other buildings also are adversely affected by dangerous extermination spraying systems. Typically, treated interior areas, in either a home or in a restaurant, for example, such as kitchen or bathroom floors or under sinks, are, at best, temporarily treated since, when the floors or sink areas are cleaned, the pesticide is washed away and is wasted. At times, professional exterminators may drill holes into blind wall or cabinet cavities, spray pesticide directly into the suspected insect nest area and then seal the drilled hole with putty. This leaves unsightly evidence of wall penetration, and most importantly, prevents convenient access to the area behind the wall or cabinet since the hole is sealed. Also, the putty can deteriorate and toxic chemicals can leach out of the wall cavity through the hole and enter the living and working space. Re-treatment is inconvenient and oftentimes too late, if reapplied, after damage is done by insects. There is no way a home owner or commercial building owner can treat the area periodically themselves, rather, they must rely on the services of a professional exterminator which is undesirable, in most cases.

The inventor recognized a never before addressed problem and fulfilled a need which overcomes the limitations and issues associated with professional extermination systems.

In view of the above mentioned problems and limitations associated with conventional pest control systems, it was recognized by the present inventor that there is an unfulfilled need for a do-it-yourself pest treatment system that is safe and easy to use, is effective and is economical.

Accordingly, it becomes clear that there is a great need for a pesticide injection system which overcomes the disadvantages associated with pest control systems of the prior art. Such a pesticide injection system should be one that works as desired, is safe and easy to use and is economically manufactured.

SUMMARY OF THE INVENTION

It is therefore an object of this invention to provide a pesticide injection system which avoids the aforementioned problems of prior art pest control systems.

It is another object of this invention to provide a pesticide injection system that safely exterminates insect pests hidden within the walls of a structure while preventing the insects from infesting such areas.

It is another object of this invention to provide a pesticide injection system which rapidly permits treatment of a structure by providing a low pressure application of a powder pesticide.

It is another object of this invention to provide a pesticide injection system that minimizes the exposure of pesticides to the occupants of a building.

It is a further object of this invention to provide a pesticide injection system that is readily installed and safely operated by a home owner or do-it-yourselfer.

It is a further object of this invention to provide a pesticide injection system that may be utilized on a wide variety of buildings.

It is a further object of this invention to provide a pesticide injection system which may be manufactured from readily available materials by conventional manufacturing processes.

It is still a further object of this invention to provide a pesticide injection system that is simple in design, simple to manufacture, low in cost, safe and is easy and fun to use.

This invention results from the realization that there is a great need for a highly functional pesticide injection system; the resulting invention provides such benefits.

According to a first aspect of the present invention, disclosed is a pesticide injection system comprising a plug frictionally engageable with a wall. The plug having a tube with an open end and a closed end. The means for preventing back flow disposed within the tube near the closed end is a check valve. The plug has a flange integral with the tube disposed at the open end of the tube. The means for selectively covering the open end of the tube is a door with a door stop, a door seal and a pivot thereon cooperatively engaging the flange. An applicator having a pliable bottle for receiving a powder pesticide and a nozzle selectively attachable to the pliable bottle and insertable into the plug is utilized for injecting the powder pesticide into a blind space behind the wall. The means for exposing a port on the nozzle is a sleeve cooperatively biased in a closed position by a sleeve spring disposed on the nozzle between a sleeve stop having a flat for cooperating with a guide, a second detent and by a nozzle cap. The means for interlocking the nozzle to the plug is a collar having a third slot and slidably disposed vertically thereby on the nozzle between a first detent and the second detent. The collar having a guide cooperating with a notch and with a tang on the second detent and with the flange. The flange has a first slot for rotatably engaging the guide and a second slot for rotatably engaging the tang. The interlocking means cooperates with the port exposing means.

The second aspect, in accordance with the present invention, is a special case of the first aspect of this invention with additional features. The door, door seal and the check valve prevent the powder pesticide from back flowing into a living space when the nozzle is withdrawn from the plug. The means for exposing the port on the nozzle for discharging the powder pesticide therethrough and the means for interlocking said nozzle to the plug further prevent the powder pesticide from spilling into the living space during use.

The third aspect of the present invention discloses a method for safely injecting a powder pesticide into a cavity behind a wall.

BRIEF DESCRIPTION OF THE DRAWINGS

In the accompanying drawings:

FIG. 1 is a partial cross sectional view of an illustrative embodiment of a pesticide injection system of the instant invention in use prior to injection;

FIG. 1A is a cross sectional view taken along the plane A-A of the instant invention of FIG. 1;

FIG. 2 is a partial cross sectional view of the illustrative embodiment of the pesticide injection system of the instant invention of FIG. 1 in use;

FIG. 2B is a cross sectional view taken along the plane B-B of the instant invention of FIG. 2;

FIG. 3 is a cross sectional view of a plug;

FIG. 4 is a left side elevation view of the plug of FIG. 3;

FIG. 5 is a right side elevation view of the plug of FIG. 3;

FIG. 6 is a front elevation view of a nozzle with a collar and a sleeve;

FIG. 7 is a cross sectional view of the nozzle of FIG. 6;

FIG. 7A is a view taken along the plane A-A of the nozzle of FIG. 7;

FIG. 8 is a cross sectional view of the sleeve shown in FIG. 6.

FIG. 8A is a right side elevation view of the sleeve of FIG. 8;

FIG. 9 is a view of the collar of FIG. 6;

DETAILED DESCRIPTION OF ILLUSTRATIVE EMBODIMENTS

Figure 10:
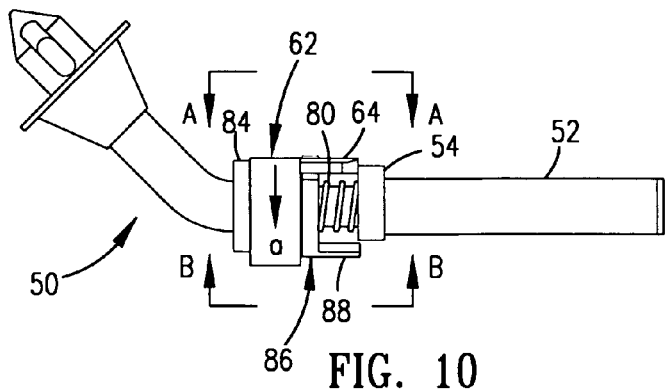
FIG. 10 is a front elevation view of the nozzle with the collar of FIG. 6 in a locked position.

Looking more particularly to the drawings, there is shown in FIG. 1 an illustrative embodiment of a pesticide injection system, which is generally indicated at 10, according to an embodiment of the present invention. FIG. 1 is a partial cross sectional view of an illustrative embodiment of a pesticide injection system 10 of the instant invention in use prior to injection. FIG. 1A is a cross sectional view taken along the plane A-A of the instant invention 10 of FIG. 1.

As best seen in FIG. 1 and in FIGS. 1A, 2B, 2-7, 7A, 8, 8A, 9, 10, 10A, 10B, 11, 12, 12A, 20 and 21, the pesticide injection system 10, comprises a plug 12 frictionally engageable with a wall 100. The plug 12 has a tube 14 with an open end 16 and a closed end 18; means for preventing back flow disposed within the tube 14 near the closed end 18; a flange 22 integral with the tube 14 disposed at the open end 16 of the tube 14; means for selectively covering the open end 16 of the tube 14. Utilized is an applicator 42 having a pliable bottle 44 with a screw cap 48 for receiving a powder pesticide and a nozzle 50 selectively attachable to the pliable bottle 44 and insertable into the plug 12 for injecting the powder pesticide into a blind space 106 behind the wall 100 suspected of harboring insects without the powder pesticide contacting the insulation 104 when the pliable bottle 44 is squeezed. The nozzle 50 has a first detent 84 in a spaced apart relationship to a second detent 86 having a tang 88 and a notch 66, a nozzle cap 58, a port 60 and an angular portion 76 with a puncture member 72 having cut outs 74. There are means for exposing the port 60 on the nozzle 50 and means for interlocking the nozzle 50 to the plug 12 and the interlocking means cooperating with the port exposing means.

FIG. 2 is a partial cross sectional view of the illustrative embodiment of the pesticide injection system of the instant invention 10 of FIG. 1 in use and FIG. 2B is a cross sectional view taken along the plane B-B of the instant invention of FIG. 2.

FIG. 3 is a cross sectional view of the plug 12. The means for preventing back flow is a check valve biased in a closed position in the form of a piston 38 and a piston spring 40 which slidingly cooperates with an aperture 20 on the tube 14 and with the port 60 on the nozzle 50.

FIG. 4 is a left side elevation view of the plug 12 of FIG. 3. The flange 22 has a door 28 with a handle 34 for manual operation in the direction of the arrows and a pivot 32. A door stop 30 restricts the motion of the door 28 so that it aligns with the open end 16 of the tube 14. The flange 22 has a first slot 24 for rotatably engaging a guide 64 and a second slot 26 for rotatably engaging the tang 88 associated with the means for interlocking the nozzle 50 to the plug 22.

FIG. 5 is a right side elevation view of the plug 12 of FIG. 3. The means for selectively covering the open end 16 of the tube 14 is the door 28 with the door stop 30, a door seal 36 and the pivot 32 thereon cooperatively engaging the flange 22. The door seal 36 fits over the open end 16 of the tube 14 when the door 28 is closed, thereby sealing the open end 16 and further preventing back flow of powder pesticide into a living area. The plug 12 frictionally engages the wall 100. The frictional wall engagement may also include an adhesive backed two sided tape 82 seen in FIG. 5 or a fastener similar to that shown in phantom in FIGS. 18, 19 and 21. Alternately the plug 12 may be fabricated with a slight taper or with fins for better fit, as needed.

As best seen in FIGS. 6, 7, 8 and 8A the means for exposing a port 60 on the nozzle 50 is a sleeve 52 cooperatively biased in a closed position against the nozzle cap 58 by a sleeve spring 80 disposed on the nozzle 50 between a sleeve stop 54 having a flat 56 for cooperating with the guide 64 and the second detent 86.

Referring to FIGS. 6, 9, 10, 10A, 10B, 11, 12 and 12A, the means for interlocking the nozzle 50 to the plug 22 is a collar 62 having a third slot 110 and slidably disposed vertically thereby on the nozzle 50 between the first detent 84 and the second detent 86. The collar 62 has the guide 64 cooperating with the notch 66 and with the tang 88 on the second detent 86 and with the flange 22. The flange 22 utilizes the first slot 24 for rotatably engaging the guide 64 and the second slot 26 for rotatably engaging the tang 88.

The nozzle 50 has the first detent 84 in a spaced apart relationship to the second detent 86 having the tang 88 and the notch 66 as seen in FIGS. 7 and 7A.

The nozzle 50 further includes a puncture member 72 with cut outs 74 best seen in FIG. 7.

Figure 16:
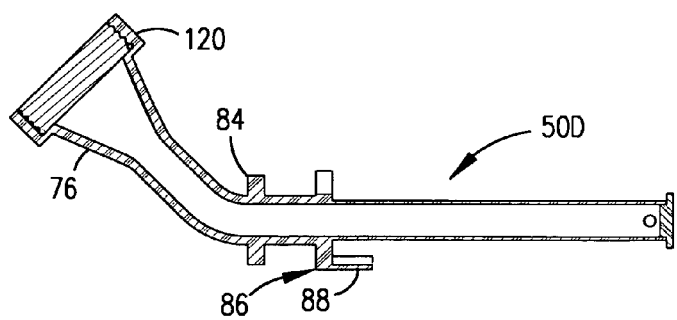
FIG. 16 is a cross sectional view of an illustrative embodiment of an angular nozzle with a threaded member.
Figure 17:
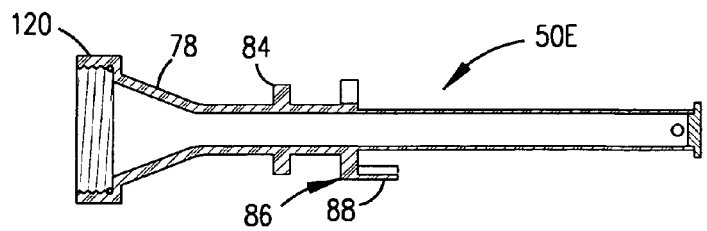
FIG. 17 is a cross sectional view of an illustrative embodiment of a straight nozzle with a threaded member.

The nozzle 50 may alternately have a threaded member 120 seen in FIGS. 16 and 17.

The nozzle 50, the plug 12 and the interlocking means and the pliable bottle 44 and screw cap 48 are plastic molded.

Figure 13:
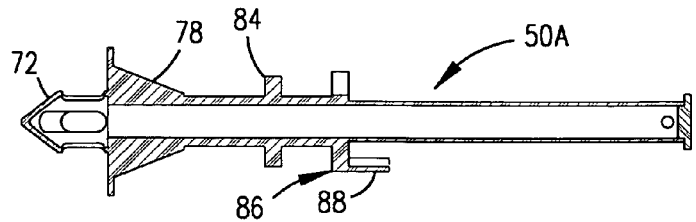
FIG. 13 is a cross sectional view of an illustrative embodiment of a straight nozzle with a puncture member.

FIG. 13 is a cross sectional view of an illustrative embodiment of a straight nozzle 50A with a straight portion 78 and the puncture member 72.

Figure 14:
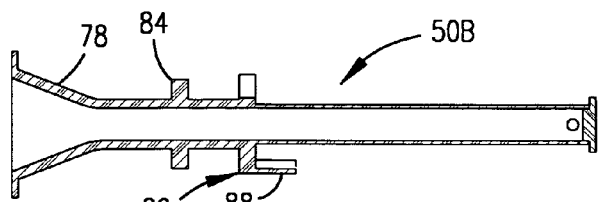
FIG. 14 is a cross sectional view of an illustrative embodiment of a straight nozzle without the puncture member of FIG. 13.

FIG. 14 is a cross sectional view of an illustrative embodiment of a straight nozzle 50 B with a straight portion 78 without the puncture member 72 of FIG. 13.

Figure 15:
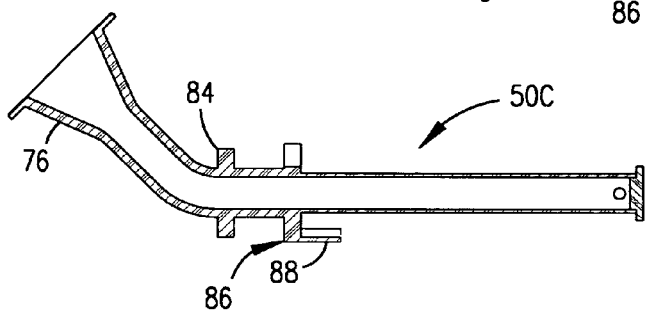
FIG. 15 is a cross sectional view of an illustrative embodiment of an angular nozzle without the puncture member of FIG. 13.

FIG. 15 is a cross sectional view of an illustrative embodiment of an angular nozzle 50 C with an angular portion 76 without the puncture member 72 of FIG. 13.

FIG. 16 is a cross sectional view of an illustrative embodiment of an angular nozzle 50D with an angular portion 76 with a threaded member 120.

FIG. 17 is a cross sectional view of an illustrative embodiment of a straight nozzle 50C with a straight portion 78 with a threaded member 120.

Figure 19:
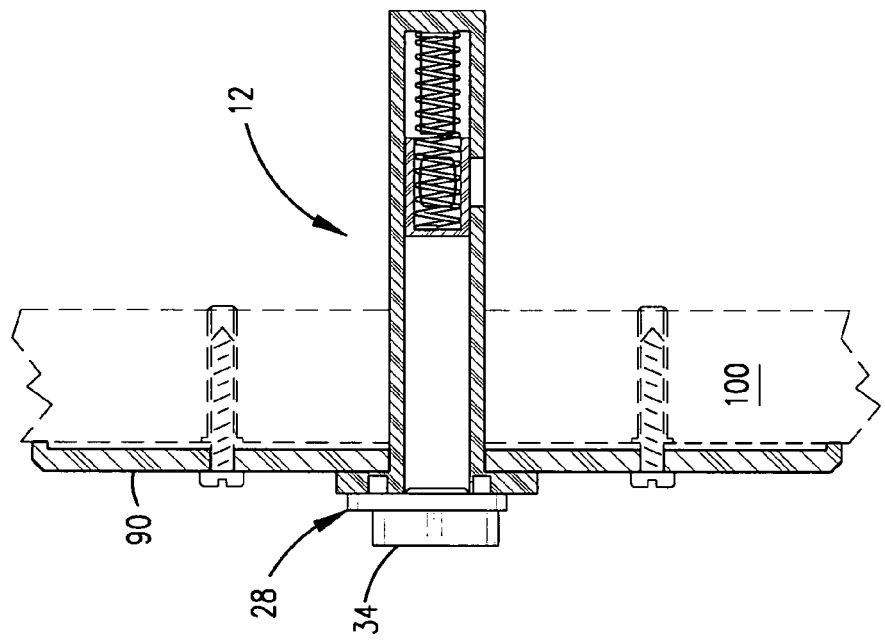
FIG. 19 is a cross sectional view of the wall plate covering the plug of FIG. 17 installed on a wall shown in phantom.
Figure 18:
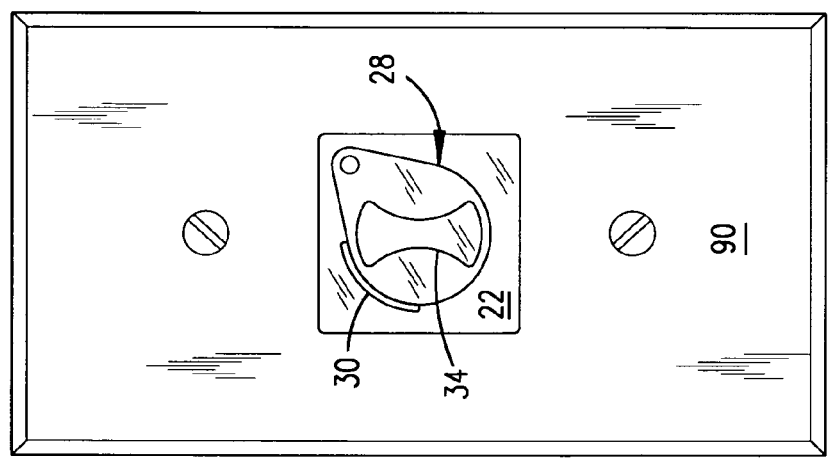
FIG. 18 is a front elevation view of a wall plate covering the plug.
Figure 21:
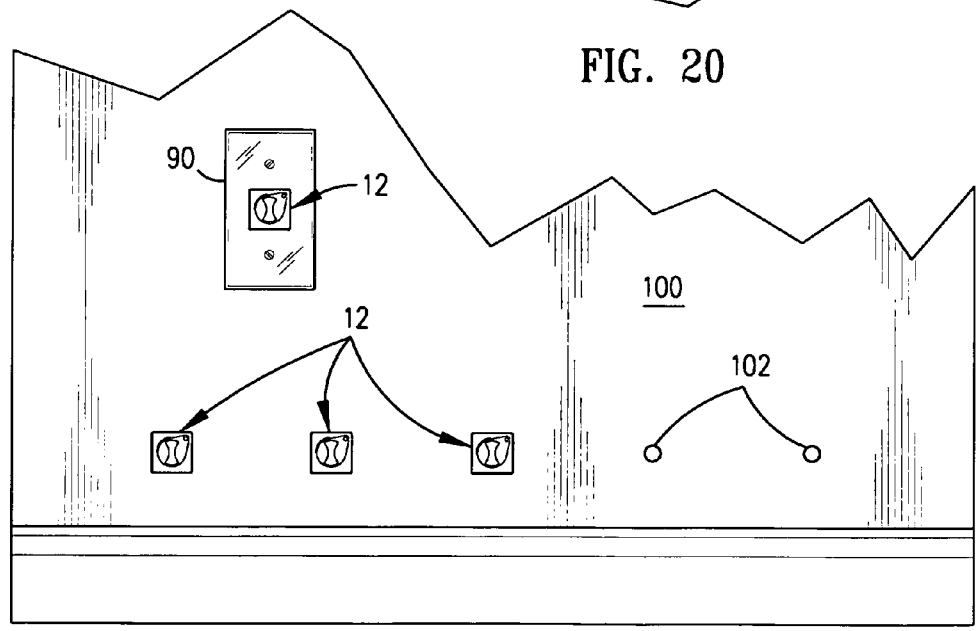
FIG. 21 is a front elevation view showing the mounting of the plug and wall plate onto a wall.

The plug 12 is mountable with a wall plate 90 as seen in FIGS. 18, 19, and 21. The wall plate 90 may also include an adhesive backed two sided tape 82 similar to that seen in FIG. 5 or may alternately have mounting screws as shown in phantom in FIGS. 18, 19 and 21.

Figure 10A:
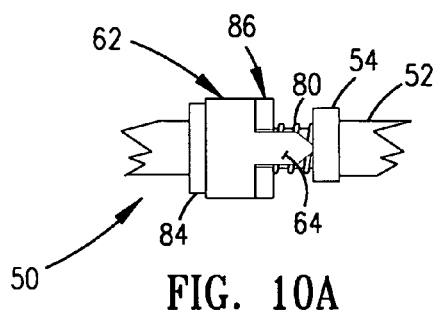
FIG. 10A is a top plan view taken along the plane A-A of the nozzle with the collar of FIG. 10.
Figure 10B:
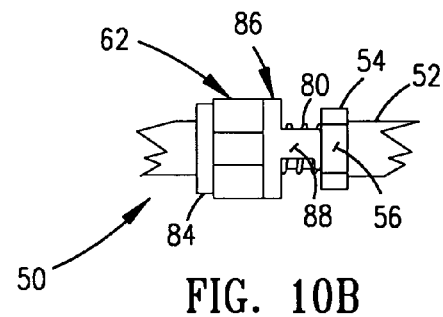
FIG. 10B is a bottom plan view taken along the plane B-B of the nozzle with the collar of FIG. 10.
Figure 11:
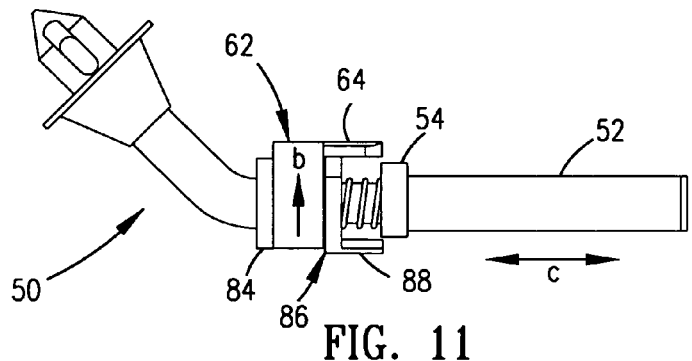
FIG. 11 is a front elevation view of the nozzle with the collar of FIG. 10 in an unlocked position.
Figures 12, 12A:
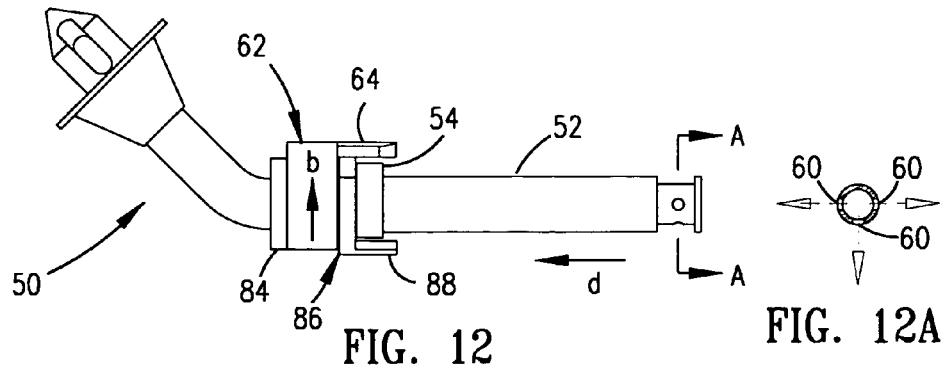
FIG. 12 is a front elevation view of the nozzle with the collar of FIG. 11 in an open position.
FIG. 12A is a cross sectional view taken along the plane A-A of the nozzle with the collar of FIG. 12.
Figure 20:
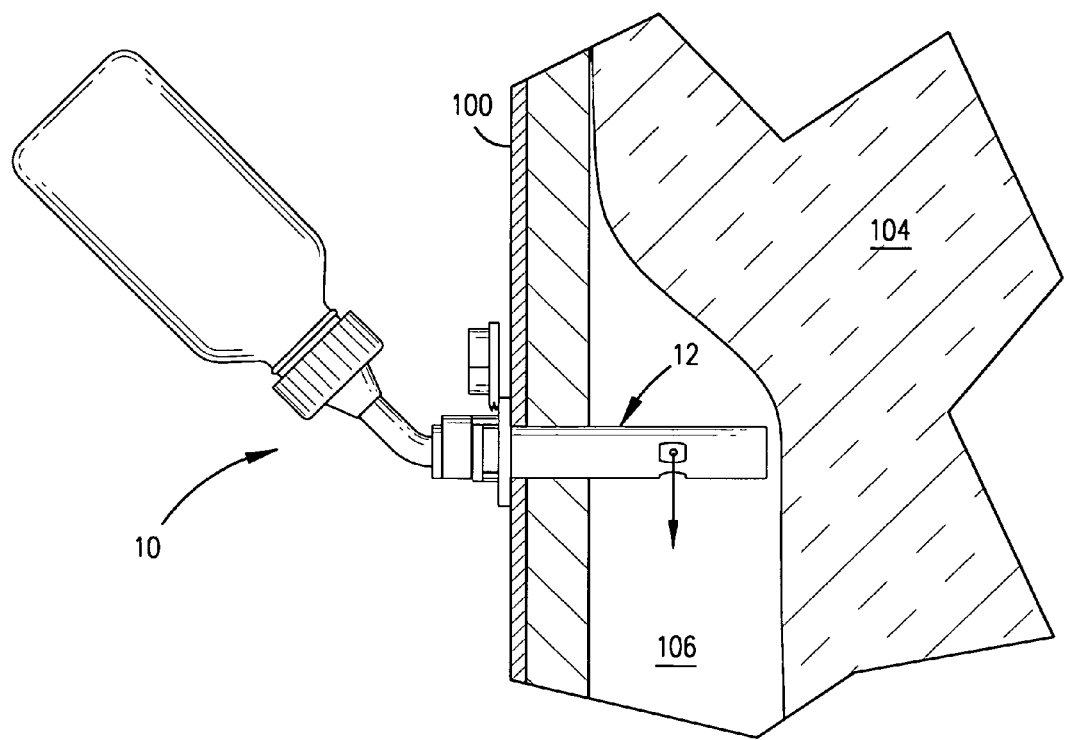
FIG. 20 is a partial cross sectional view showing a pesticide injection system in operation as installed into a wall with the insulation displaced and the powder pesticide discharged into a blind space behind the wall.

To use the pesticide injection system 10, a user drills a hole 102 into the wall 100 as seen in FIG. 21, and pushes the plug 12 into the hole 102 thereby frictionally engaging the wall 100. Any insulation 104 is pushed away when the plug 12 is installed as seen in FIG. 20. The door 28 is normally closed when installed as seen in FIGS. 18, 19 and 21; the wall plate 90 is also shown. When ready to treat a suspected insect infested area, the door 28 is opened as seen in FIGS. 1, 2, 4, 5 and 20 and the nozzle 50 of the applicator 20 is rotatively inserted into the plug 12 until the nozzle 50 is seated in the first slot 24 and in the second slot 26 of the flange 22 of the plug 12 as seen in FIG. 4 and in FIGS. 2 and 2B. The collar 62, which, in a similar manner, acts like a safety mechanism on a firearm, is initially in a position that prevents the sleeve 52 from exposing the port 60 when the guide 64 contacts the sleeve stop 54 and from allowing the nozzle 50 to engage the flange 22 of the plug 12 as seen in FIGS. 10, 10A and 10B and further indicated by the arrow "a" thereby not permitting any powder pesticide to flow. When the collar 62 is pushed vertically upward in the direction indicated by the arrow "b" in FIG. 11, the sleeve 52 still covers the port 60 and is allowed to move linearly in a direction as indicated by the arrow "c". This is the position prior to insertion into the flange 22 of the plug 12 described above prior to use as seen in FIGS. 1 and 1A. As seen in FIG. 12, when the nozzle 50 is rotatably inserted into the plug 12, as above, sleeve 52 moves in the direction of the arrow "d" exposing the port 60 and allowing powder pesticide to flow through the port 60 in the direction shown in FIG. 12A and when the nozzle 50 is in place, the powder pesticide further flows through the aperture 20 in the plug 12 as best seen in FIGS. 2, 2B and 20. The tang 88 may freely move over the sleeve stop 54 via a flat 56 as best seen in FIGS. 8A and 10B without interference during operation. Also, as seen in FIG. 7A, the notch 66 in the second detent 86 allows the guide 64 to freely move therethrough.

In operation, a user simply squeezes the pliable bottle 44 to expel the power pesticide through the aperture 20 in the plug 12 and through the port 60 in the nozzle 50 into a blind space 102 behind the wall 100. Direction of injection of the powder pesticide is shown via arrows as indicated in FIGS. 2, 2B, 12A and 20. The door 28 is closed after the nozzle 50 is rotatively disengaged from the plug 12 and is withdrawn after treatment and the collar 62 may be repositioned to the initial position of FIGS. 10, 10A and 10B.

It is understood that pesticide injection system 10 are illustrated embodiments which may have various combinations of the components described above without departing from this disclosure. A few of the wide variety of combinations and variations that are apparent from the disclosure herein are shown in FIGS. 1 and 13-17.

From the above, it is understood that the pesticide injection system 10 may be fabricated from a wide variety and combinations of materials and in a various styles, colors, shapes and designs and being fully capable and readily adaptable to fit any structure without departing from this disclosure.

The applicant has actually reduced the invention to practice by constructing a working prototype according to the teachings of this invention.

The applicant has recognized a need and have solved a heretofore unknown problem in the prior art in creating a pesticide injection system 10. Surprisingly, the instant invention provides an added advantage and recognizes a problem and adequately and completely addresses an unfulfilled need, in that the pesticide injection system 10 and variations thereof in the manner disclosed, in effect, defines a highly functional, safe and useful apparatus that is not presently available. This is due entirely to the particular way the applicant designed and fabricated the pesticide injection system 10 and the other embodiments disclosed herein which are not found or taught in the prior art. By doing so, the applicant is able to use inexpensive materials in the fabrication without sacrificing performance, rather, achieving superior unexpected results, due to the particular construction which is cost effective.

One practical advantage of the invention is that it provides a convenient, practical, low cost, pesticide injection system 10 which allows a user to conveniently, and in an efficient manner, to safely and conveniently apply a powder pesticide as a preventive measure and for eradicating any insects nesting in a normally inaccessible cavity of a wall structure. Still another advantage is that the pesticide injection system 10 is designed for ease of manufacture by standard methods such as by plastic molding and by using readily available materials particularly chosen for the problem solved. Furthermore, the pesticide injection system 10 and variations may be provided for example, as a kit of, six pre-filled powder pesticide pliable bottles 44 with about 4 oz of powder pesticide and with six nozzles 50, to readily allow a way for a do-it-yourselfer to safely apply the powder pesticide. The pliable bottles 44 may be sealed with one of a foil and with an adhesive and may be disposable or refillable and suitable nozzles 50, 50A, 50B, 50C and 50E may be interchangeably used without departing from this disclosure.

Of course, a wide variety of further uses and advantages of the present invention will become apparent to one skilled in the art. As disclosed, it is apparent that one skilled in the art will realize that the foregoing discussion outlines the more important features of the invention to enable a better understanding of the instant invention and to instill a better appreciation of the inventors contribution to the art. It must be clear that the disclosed details of construction, descriptions of geometry and illustrations of inventive concepts are mere examples of possible manifestations of the invention.

Although the invention has been shown and described with reference to certain illustrative embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A pesticide injection system comprising:
   a plug frictionally engageable with a wall;
   said plug having a tube with an open end and a closed end and a wall of said tube having an aperture therein near said closed end; means for preventing back flow disposed within said tube between said closed end and said open end, and said means for preventing back flow slidably extending near and cooperating with the aperture; a flange integral with said tube disposed at said open end of said tube; and means for selectively covering said open end of said tube;
   an applicator having a pliable bottle for receiving a powder pesticide and a nozzle selectively attachable to said pliable bottle and rotatively seatable into said flange of said plug without passing through and exiting said plug during operation for injecting the powder pesticide into a blind space behind the wall;
   means for exposing a port on said nozzle, wherein said port exposing means disposed on said nozzle and selectively allowing said port to cooperate with the aperture of said tube of said plug;
   means for interlocking said nozzle to said plug disposed on said nozzle so that inadvertent injection of the powder pesticide is prevented until said nozzle is engageably mated with said plug; and
   said interlocking means cooperating with said port exposing means.

2. The pesticide injection system of claim 1 wherein said means for preventing back flow is a check valve.

3. The pesticide injection system of claim 2 wherein said check valve includes a piston and a piston spring.

4. The pesticide injection system of claim 1 wherein said means for selectively covering said open end of said tube is a door with a door stop, a door seal and a pivot thereon cooperatively engaging said flange.

5. The pesticide injection system of claim 1 wherein said means for exposing a port on said nozzle is a sleeve.

6. The pesticide injection system of claim 5 wherein said sleeve is cooperatively biased in a closed position against a nozzle cap by a sleeve spring disposed on said nozzle between a sleeve stop having a flat for cooperating with a guide and a second detent.

7. The pesticide injection system of claim 1 wherein said means for interlocking said nozzle to said plug is a collar having a third slot and slidably disposed vertically thereby on said nozzle between a first detent and a second detent.

8. The pesticide injection system of claim 7 wherein said collar having a guide cooperating with a notch and with a tang on said second detent and with said flange.

9. The pesticide injection system of claim 8 wherein said flange having a first slot for rotatably engaging said guide and a second slot for rotatably engaging said tang.

10. The pesticide injection system of claim 1 wherein said nozzle having a first detent in a spaced apart relationship to a second detent having a tang and a notch.

11. The pesticide injection system of claim 10 wherein said nozzle further includes a puncture member with cut outs for breaking a seal in said pliable bottle.

12. The pesticide injection system of claim 10 wherein said nozzle further includes a threaded member.

13. The pesticide injection system of claim 1 wherein said nozzle, said plug and said interlocking means are plastic molded.

14. The pesticide injection system of claim 1 wherein said plug is mountable with a wall plate.

15. A pesticide injection system comprising:
    a plug frictionally engageable with a wall;
    said plug having a tube with an open end and a closed end and a wall of said tube having an aperture therein near said closed end with a check valve disposed within said tube between said closed end and said open end, and said check valve slidably extending near and cooperating with the aperture cooperating with a port thereon a nozzle for discharging a powder pesticide; a flange integral with said tube, a door with a door stop, a door seal and a pivot thereon cooperatively engaging said flange;
    an applicator having a pliable bottle for receiving the powder pesticide and said nozzle selectively attachable to said pliable bottle and rotatably insertable into said flange of said plug without passing through and exiting said plug during operation for injecting the powder pesticide at low pressure into a blind space behind the wall suspected of harboring insects without the powder pesticide contacting insulation when said pliable bottle is squeezed; and said nozzle having a first detent in a spaced apart relationship to a second detent having a tang and a notch;
    means for exposing the port on said nozzle, wherein said port exposing means disposed on said nozzle and selectively allowing said port to cooperate with the aperture of said tube of said plug;
    means for interlocking said nozzle to said plug disposed on said nozzle so that inadvertent injection of the powder pesticide is prevented until said nozzle is engageably mated with said plug; and
    said interlocking means cooperating with said port exposing means.

16. The pesticide injection system of claim 15 wherein said means for exposing said port on said nozzle is a sleeve cooperatively biased in a closed position against a nozzle cap by a sleeve spring disposed on said nozzle between a sleeve stop having a flat for cooperating with a guide and said second detent.

17. The pesticide injection system of claim 15 wherein said means for interlocking said nozzle to said plug is a collar having a third slot and slidably disposed vertically thereby on said nozzle between said first detent and said second detent.

18. The pesticide injection system of claim 17 wherein said collar having a guide cooperating with said notch and with said tang on said second detent and with said flange having a first slot for rotatably engaging said guide and a second slot for rotatably engaging said tang.

19. The pesticide injection system of claim 15 wherein said nozzle further includes one of a puncture member with cut outs and a threaded member.

20. A method for safely injecting a powder pesticide into a cavity behind a wall comprising the steps:
providing a plug having a tube with an open end and a closed end and a wall of said tube having an aperture therein near said closed end with a check valve disposed within said tube between said closed end and said open end, and said check valve slidably extending near and cooperating with the aperture; a flange integral with said tube; a door with a door seal cooperatively engageable with said flange;
drilling a hole in the wall;
inserting said plug into the hole;
providing an applicator having a pliable bottle with a powder pesticide and a nozzle attached to said pliable bottle and rotatively seated into said flange of said plug without passing through said plug during operation;
providing means for exposing a port on said nozzle, wherein said exposing means is a sleeve cooperatively biased in a closed position against a nozzle cap by a sleeve spring disposed on said nozzle between a sleeve stop having a flat for cooperating with a guide and a second detent;
providing means for interlocking said nozzle to said plug wherein said interlocking means is a collar having a third slot and slidably disposed vertically thereby on said nozzle between a first detent and said second detent, and said guide cooperating with a notch and with a tang on said second detent of said nozzle and with said flange and said interlocking means cooperating with said port exposing means;
rotatively inserting said nozzle into said plug, with said door open, until said nozzle is seated in a first slot and in a second slot of said flange;
squeezing said pliable bottle to expel the powder pesticide through the aperture in said plug and through the port in said nozzle into a blind space behind the wall; and
closing said door after said nozzle is rotatively disengaged from said plug and is withdrawn.

* * * * *